United States Patent Office 3,081,285
Patented Mar. 12, 1963

3,081,285
POLYMERIZATION OF α-METHYLSTYRENE IN THE PRESENCE OF AN ALUMINUM TRI-ALKYL CATALYST
John J. Monagle, Chester, Pa., assignor, by mesne assignments, to Sinclair Research, Inc., New York, N.Y., a corporation of Delaware
No Drawing. Filed Dec. 28, 1956, Ser. No. 631,054
2 Claims. (Cl. 260—93.5)

This invention relates to the polymerization of α-methylstyrene using a catalyst comprising an organo-metallic compound and a metallic chloride. The invention provides a method whereby α-methylstyrene may be polymerized to a solid polymer at low pressure, for example, atmospheric pressure.

My work has shown that the success of the atmospheric pressure polymerization of olefins to obtain solid polymers is dependent upon the selection of monomer and catalyst. For instance, when using a catalyst containing triisobutyl aluminum and titanium tetrachloride in normal heptane at atmospheric pressure, I found that isobutylene 2-methyl-1-butene, cis-2-butene, vinyl chloride, chlorotrifluoroethylene and acrylonitrile do not give solid polymers. Similarly, unsuccessful results were obtained when trying to polymerize ethylene to solid polymers at atmospheric pressure over catalysts containing diethyl aluminum bromide and one of $SnCl_4$, $PCl_5$, $PCl_3$, $ZnCl_2$, $AlCl_3$, $SiCl_4$, $Sn(Et)_4$ or $MoCl_5$. Also, catalysts containing titanium tetrachloride and one of $CaH_2$, $LiAlH_4$ or di-n-butymercury were not effective in converting ethylene to a solid polymer at atmospheric pressure.

α-Methylstyrene is ordinarily difficult to convert to a solid polymer of high melting point at atmospheric pressure and room temperature. When using free radical catalysts such as peroxides, azonitriles and the like, low polymers generally have been obtained. At 5,000 atmospheres pressure and 100° C. α-methylstyrene gives unsaturated polymers with a molecular weight of the order of 5,600. Low molecular weight polymers have also been obtained by the use of acidic catalysts such as boron trifluoride and titanium tetrachloride. High molecular weight solid polymers of high melting point have been afforded by employing low temperature polymerization and ionic catalysts. Thus at —100° C. using a 1% solution of aluminum chloride in ethyl chloride a polymer melting at 196–226° C. was obtained. However, as the temperature of the polymerization was raised the melting point of the polymer decreased until at 23° C. the melting point was 86–98° C.

I have found that the method of this invention provides relatively high melting solid polymers through contact of α-methylstyrene with catalytic amounts of a tri-lower alkyl aluminum and a titanium chloride. The reaction is carried out in liquid phase and an organic solvent can be used as a reaction medium if desired. However, the reaction can be carried out in bulk, i.e., in the absence of a solvent, and the catalyst can be disposed on a suitable solid support. The temperature range for the reaction is from about —10° C. to the boiling point of the solvent or α-methylstyrene at the pressure used. The preferred range is about 5° to 100° C. Although the reaction is preferably carried out at atmospheric pressure; higher pressures, up to the highest pressures obtainable, or subatmospheric pressures can be used. Sufficient pressure is employed to maintain the liquid phase, and I prefer not to go over about 500 p.s.i.

The catalyst employed in my method is comprised of two essential components which are the tri-lower alkyl aluminum and the titanium chloride. Preferred among the lower alkyl aluminums are the primary alkyl aluminums, for instance containing up to four carbon atoms such as tri-ethyl and tri-2-methyl-propyl aluminum. The chloride can be titanium tetrachloride or other chlorides of this metal such as the tri- and dichlorides. There is evidence that when the tetra- and trichlorides are employed their active forms may be lower valence chlorides such as the tri- and dichlorides.

The composition of the reaction mixture may vary widely. The mole ratio of trialkyl aluminum to α-methylstyrene is not critical. Preferably, this ratio is in the range of about 0.001 to 0.1. The mole ratio of trialkyl aluminum to titanium chloride generally can be any ratio above about 0.2 and is advantageously in the range of about 0.2 to 2.

The catalyst is protected from substances such as water, oxygen, carbon dioxide, etc. which deactivate it for polymerization, by effecting the polymerization in an inert atmosphere, i.e. containing no significant amount of a material which would deactivate the catalyst. The α-methylstyrene monomer is dry and relatively free of impurities such as sulfur compounds, ketones, etc. which would adversely affect catalyst activity.

Many organic solvents are suitable for use in the method of the invention. Thus any of the aliphatic hydrocarbons such as pentane, hexane, n-heptane, etc., a cyclic hydrocarbon such as decalin, or, although less desirable, an aromatic hydrocarbon such as benzene, toluene, xylene, etc. The aliphatic hydrocarbons are preferred as are the saturated hydrocarbons containing about 4 to 10 carbon atoms.

Examples of the method of the invention are as follows.

*Example I*

This example was carried out in a nitrogen atmosphere and at atmospheric pressure. 1.58 moles of α-methylstyrene was placed in a 500 cc. flask fitted with a stirrer. The α-methylstyrene was cooled to —10° C. and a solution consisting of 0.015 mole of tri-2-methylpropyl aluminum (triisobutyl aluminum) and 25 cc. of n-heptane was added thereto. After this addition, the temperature rose to —5° C. 0.021 mole of titanium tetrachloride was then added to the flask and the stirrer was started. Stirring was continued for 36 minutes, and during this time the temperature rose to 40° C. The catalyst was then decomposed by the addition of ethanol to the flask. The n-heptane was removed by distillation leaving a viscous oil. White solid polymer of α-methylstyrene was obtained by dissolving the oil in methyl ethyl ketone and adding the resulting solution to a large excess of methanol. The yield of white solid α-methylstyrene polymer was 138 g. This polymer melted at 133–144° C.

In the method of the invention it is essential that the catalyst contain each of the components tri-lower alkyl aluminum and titanium chloride. That each of these components is required can be seen from Examples II and III which follow. In Example II, only triisobutyl aluminum was used while in Example III only titanium tetrachloride was used. In neither example was any significant amount of polymer obtained. The reaction of each of these examples was carried out in a nitrogen atmosphere and at atmospheric pressure.

*Example II*

0.2 mole of α-methylstyrene was placed in a small bottle and 0.003 ml. of triisobutyl aluminum was added thereto. The clear solution was allowed to stand for ½ hour and was then poured into 400 ml. of methanol. Only 0.02 g. of solid polymer was obtained.

*Example III*

0.2 mole of α-methylstyrene was placed in a small bottle and 0.005 ml. of titanium tetrachloride was added thereto. A reaction time of ¼ hour was allowed. The mixture was then poured into methanol and 0.1 mole of semi-viscous polymer was obtained. This semi-viscous polymer was dissolved in methyl ethyl ketone. Methanol was added to the resulting solution. This precipitated 0.9 g. (0.007 mole) of white solid melting at 88° to 101° C.

The poly-α-methylstyrene product of this invention is thermoplastic and useful for making molded and extruded articles, ornamental and rigid packages, and many other objects.

I claim:
1. The method of polymerizing α-methylstyrene to obtain solid polymer which comprises polymerizing in the liquid phase α-methylstyrene by contact with a catalyst consisting essentially of tri-2-methylpropyl aluminum and titanium tetrachloride in an inert atmosphere at about atmospheric pressure and at about 5° to 100° C., the mole ratio of tri-2-methylpropyl aluminum to α-methylstyrene being about 0.001 to 0.1 and the mole ratio of tri-2-methylpropyl aluminum to titanium tetrachloride being about 0.2 to 2.

2. The method of claim 1 in which the catalyst is in a liquid hydrocarbon solvent of about 4 to 10 carbon atoms.

References Cited in the file of this patent

UNITED STATES PATENTS

| 2,543,306 | Staudinger | Feb. 27, 1951 |
| 2,603,629 | Bloch | July 15, 1952 |

FOREIGN PATENTS

| 538,782 | Belgium | Dec. 6, 1955 |

OTHER REFERENCES

Gaylord et al.: Linear and Stereoregular Addition Polymers, p. 466 (1959), Interscience Publishers, Inc., New York.